(12) United States Patent
Muraoka

(10) Patent No.: US 8,640,178 B2
(45) Date of Patent: Jan. 28, 2014

(54) SERVER, CONTENT PROVIDING APPARATUS, CONTENT RECEIVING APPARATUS, CONTENT PROVIDING METHOD, CONTENT RECEIVING METHOD, AND PROGRAM

(75) Inventor: Kazuhiko Muraoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1560 days.

(21) Appl. No.: 10/902,016

(22) Filed: Jul. 30, 2004

(65) Prior Publication Data

US 2005/0034150 A1    Feb. 10, 2005

(30) Foreign Application Priority Data

Aug. 7, 2003 (JP) ................................ 2003-289207

(51) Int. Cl.
*H04N 7/173* (2011.01)
*H04N 5/917* (2006.01)
*H04N 5/84* (2006.01)
*H04N 5/89* (2006.01)

(52) U.S. Cl.
USPC ........... 725/115; 725/116; 725/118; 725/134; 386/330; 386/332

(58) Field of Classification Search
None
See application file for complete search history.

(56) References Cited

U.S. PATENT DOCUMENTS

| | | | | |
|---|---|---|---|---|
| 5,751,336 A * | 5/1998 | Aggarwal et al. | ............ | 725/146 |
| 5,999,622 A * | 12/1999 | Yasukawa et al. | ............ | 705/51 |
| 6,230,162 B1 * | 5/2001 | Kumar et al. | ............ | 382/240 |
| 6,424,972 B1 * | 7/2002 | Berger et al. | ............ | 1/1 |
| 6,530,082 B1 * | 3/2003 | Del Sesto et al. | ............ | 725/9 |
| 6,901,206 B2 * | 5/2005 | DaSilva | ............ | 386/239 |
| 7,085,843 B2 * | 8/2006 | Buddhikot et al. | ............ | 709/231 |
| 7,143,431 B1 * | 11/2006 | Eager et al. | ............ | 725/101 |
| 7,274,864 B2 * | 9/2007 | Hsiao et al. | ............ | 386/241 |
| 7,359,623 B2 * | 4/2008 | Murakami | ............ | 386/351 |
| 7,599,972 B2 * | 10/2009 | Dodge et al. | ............ | 1/1 |

(Continued)

FOREIGN PATENT DOCUMENTS

| | | |
|---|---|---|
| JP | 11-134259 | 5/1999 |
| JP | 2000-322292 | 11/2000 |
| JP | 2001-337918 | 12/2001 |

OTHER PUBLICATIONS

R. L. Haskin; "Tiger Shark—A Scalable File System for Multimedia"; IBM Journal of Research and Development; Mar. 1998; vol. 42, No. 2; pp. 185-197; URL: http://www.research.ibm.com/journal/rd/422/haskin.pdf.

(Continued)

*Primary Examiner* — Mushfikh Alam
(74) *Attorney, Agent, or Firm* — Oblon, Spivak, McClelland, Maier & Neustadt, L.L.P.

(57) ABSTRACT

Distribution of contents through a network with reduced load on a server is enabled. Moreover, distribution with higher security is enabled. A server side connected to a predetermined network has a content database for managing data related to contents that can be distributed, a content cluster list containing data related to division of each content into clusters, and a cluster database related to an address where each cluster is stored. A device side that can be connected to the server saves at least a part of clusters of a received content by each cluster formed by dividing the content, and transfers a predetermined cluster saved by content saving processing to an indicated address in response to a request for transfer of a cluster of the received content.

33 Claims, 14 Drawing Sheets

| CONTENT NUMBER | TOTAL NUMBER | CLUSTER 1 | CLUSTER 2 | CLUSTER 3 | CLUSTER 4 | ........ | |
|---|---|---|---|---|---|---|---|
| 1 | 4 | 1, 3, 4, 7, 8 | 1, 2, 4, 5, 6 | 2, 3, 5, 6, 7 | 8, 10, 12 | | |
| 2 | 10 | x, x, x, x, x | x, x, x, x, x | x, x, x, x, x | x, x, x, x, x | | |
| 3 | 15 | x, x, x, x, x | x, x, x, x, x | x, x, x, x, x | x, x, x, x, x | | |
| ⋮ | | | | | | | |
| | | | | | | | |

(56) References Cited

U.S. PATENT DOCUMENTS

| | | | |
|---|---|---|---|
| 2002/0156912 A1* | 10/2002 | Hurst et al. | 709/236 |
| 2003/0156824 A1* | 8/2003 | Lu | 386/68 |
| 2003/0200207 A1* | 10/2003 | Dickinson | 707/3 |
| 2004/0052191 A1* | 3/2004 | Sako et al. | 369/59.25 |
| 2004/0064629 A1* | 4/2004 | Kaku | 711/1 |
| 2004/0216164 A1* | 10/2004 | Hayhurst | 725/86 |
| 2005/0021501 A1* | 1/2005 | Butron | 707/2 |
| 2005/0278731 A1* | 12/2005 | Cameron et al. | 725/14 |
| 2006/0072611 A1* | 4/2006 | Kamperman et al. | 370/473 |
| 2006/0190983 A1* | 8/2006 | Plourde, Jr. | 725/145 |
| 2006/0254411 A1* | 11/2006 | Alcalde et al. | 84/608 |
| 2006/0277171 A1* | 12/2006 | Ellis et al. | 707/3 |

OTHER PUBLICATIONS

Kenji Kahata; "Key Technology of the Contents Business, Contents Delivery Network"; Internet Magazine $2^{nd}$ Stage No. 101, Inpress Co., Ltd., Jun. 1, 2003; pp. 184-189.

* cited by examiner

| MANAGEMENT NUMBER | DEVICE ID | IP ADDRESS | SUBSCRIPTION INFORMATION (COURSE, TIME LIMIT, ETC.) |
|---|---|---|---|
| 1 | XXXXXXXX | XXX, XXX, XXX, XXX | ・・・・・・・・・・・・・・ |
| 2 | XXXXXXXX | XXX, XXX, XXX, XXX | ・・・・・・・・・・・・・・ |
| 3 | XXXXXXXX | XXX, XXX, XXX, XXX | ・・・・・・・・・・・・・・ |
| ⋮ | | | |
| | | | |

FIG. 7

| CONTENT NUMBER | TITLE | SEARCH KEYWORD | CLUSTER SIZE | SUBSCRIPTION INFORMATION (ATTRIBUTE) | EXPLANATION |
|---|---|---|---|---|---|
| 1 | Xxxxxxxxxxx | xxx, xxx, xxx | 10240 | | ......... |
| 2 | Xxxxxxxxxxx | xxx, xxx, xxx | 5120 | | ......... |
| 3 | Xxxxxxxxxxx | xxx, xxx, xxx | 5120 | | ......... |
| ⋮ | | | | | |
| | | | | | |

FIG. 8

| CONTENT NUMBER | TOTAL NUMBER | CLUSTER 1 | CLUSTER 2 | CLUSTER 3 | CLUSTER 4 | ....... | |
|---|---|---|---|---|---|---|---|
| 1 | 4 | 1, 3, 4, 7, 8 | 1, 2, 4, 5, 6 | 2, 3, 5, 6, 7 | 8, 10, 12 | | |
| 2 | 10 | x, x, x, x, x | x, x, x, x, x | x, x, x, x, x | x, x, x, x, x | | |
| 3 | 15 | x, x, x, x, x | x, x, x, x, x | x, x, x, x, x | x, x, x, x, x | | |
| ⋮ | | | | | | | |
| | | | | | | | |

FIG. 9

| CLUSTER NUMBER | ID1/KEY1 | ID2/KEY2 | ID3/KEY3 | ID4/KEY4 | ID5/KEY5 | ....... | |
|---|---|---|---|---|---|---|---|
| 1 | xxxx/xxx | xxxx/xxx | xxxx/xxx | xxxx/xxx | xxxx/xxx | | |
| 2 | xxxx/xxx | xxxx/xxx | xxxx/xxx | xxxx/xxx | xxxx/xxx | | |
| 3 | xxxx/xxx | xxxx/xxx | xxxx/xxx | xxxx/xxx | xxxx/xxx | | |
| ⋮ | | | | | | | |
| | | | | | | | |

FIG. 10

| CUE SHEET HEADER | CONTENT INFORMATION 1 | CONTENT INFORMATION 2 | ... | CONTENT INFORMATION n |
|---|---|---|---|---|

FIG. 11

| NUMBER OF CONTENT INFORMATION ITEMS | INSTRUCTION | OTHER INFORMATION |
|---|---|---|

FIG. 12

| CONTENT INFORMATION HEADER | CLUSTER INFORMATION 1 | CLUSTER INFORMATION 2 | ... | CLUSTER INFORMATION n |
|---|---|---|---|---|

FIG. 13

| CONTENT ATTRIBUTE | CLUSTER SIZE | SAVING ENCRYPTION KEY | OTHER INFORMATION |
|---|---|---|---|

FIG. 14

| CONTENT NUMBER | LIST NUMBER | CLUSTER ARRAY | TIME INFORMATION | SAVING FLAG | IP/Key 1 | IP/Key 2 |
|---|---|---|---|---|---|---|

| IP/Key 3 | IP/Key 4 | IP/Key 5 | IP/Key 6 | IP/Key 7 | IP/Key 8 | .... | IP/Key N |
|---|---|---|---|---|---|---|---|

SERVER, CONTENT PROVIDING APPARATUS, CONTENT RECEIVING APPARATUS, CONTENT PROVIDING METHOD, CONTENT RECEIVING METHOD, AND PROGRAM

BACKGROUND OF THE INVENTION

1. Field of the Invention

This invention relates to a server, a content providing apparatus and a content receiving apparatus that are suitable for application to the case of distributing content data such as video programs through a network such as the Internet, a content providing method and a content receiving method applied to these apparatuses, and a program for executing these methods.

2. Description of the Related Art

Conventionally, in a streaming service to distribute a relatively large volume of content data such as video programs through the Internet, one server for providing contents is installed or servers for providing contents are installed at one place, and many clients are connected to the server in a centralized manner.

Specifically, for example, as shown in FIG. 21, one server 1 is prepared in a network and plural CPEs (customer premise equipments) 2a to 2n are prepared, which are devices on the side of clients who receive service, and each of the CPEs 2a to 2n can receive distribution of content data prepared in the server 1. In this example, 14 CPEs 2a to 2n are prepared and seven CPEs 2a to 2g of them are now receiving distribution of content data from the server 1 while the other CPEs are on standby. In this example, only 14 CPEs are used for simplifying the explanation. In many cases of actual distribution of content data, more clients may access the server simultaneously.

Patent Reference 1 discloses distribution of content data or the like through a communication network such as the Internet.

Patent Reference 1: JP-A-2003-196491

Since clients access the server simultaneously, the server bears the burden of calculation and network corresponding to the total number of clients connected thereto. Generally, immediately after the content distribution service is started, many clients make requests simultaneously, and if the server does not have sufficient capability, trouble of server down occurs. If the server has sufficient capability to prevent such occurrence, the cost necessarily increases accordingly. Since the number of requests decreases with the lapse of time from the start of the service, the prepared server capability then turns out to be excessive investment. On the other hand, there also is a possibility that if the service becomes very popular, reinforcement of the server cannot catch up with unexpected increase in the number of requests for the service and server down occurs, losing opportunities of business. In such a content distribution system, for example, the number of expected simultaneous accesses to very popular contents may exceed one million.

In the example of FIG. 21, the seven CPEs 2a to 2g are receiving the service. In this case, the server 1 bears a load of arithmetic operation for the seven CPEs (often the same load of arithmetic operation as on the individual CPES) and a network load for the seven CPEs. Therefore, a device of higher cost than that of the device on the client side is demanded as the server. In the example of FIG. 21, in the worst cast, capital investment equivalent to the seven CPEs is necessary. Moreover, though the server must have capability to provide service to a statistically calculated maximum number of CPEs (in this case, for example, it is assumed that the maximum number of CPEs that simultaneously access the server is seven), the maximum number is not always reached at the time of ordinary service. If the server provides service to approximately two CPEs on average, the capability to provide service to the other five CPEs is considered to be excessive investment.

Also, in such content distribution systems, security is often weak. In many cases, in order to reduce the server load and server cost, encryption need not be performed. Therefore, there is a high risk of contents being stolen, and valuable contents are hardly distributed through networks. Even if encryption is performed, it is difficult to encrypt contents for each traffic. Generally, encryption in data distribution is applied only to a small volume of data (text data or the like). AS for large streams, data that have already been encrypted are distributed in order to reduce the cost. In this case, however, many CPEs commonly use the same key. Moreover, the contents are encrypted with the same key for a long period and the same key is sent many times. Therefore, it gives a clue to key analysis and the strength of encryption is low.

SUMMARY OF THE INVENTION

A first object of this invention is to enable distribution of contents through a network with reduced load on the server. A second object of this invention is to enable distribution of contents through a network with high security strength.

According to this invention, on the side of a server connected to a predetermined network, preparation of a content database for managing data related to contents that can be distributed through the network, preparation of a content cluster list containing data related to division of each content managed on the content database into clusters, and preparation of a cluster database related to an address at which each cluster shown in the content cluster list is stored, are carried out, and management of content distribution is carried out on the basis of the data of the prepared databases and list. On the side of a device that can be connected to the server, content saving processing to save at least a part of clusters formed by dividing a received content, by cluster, and cluster data transmission processing to manage a number of the content saved by the content saving processing and a number of the saved cluster and to transfer a predetermined cluster saved by the content saving processing to an address indicated by the server in response to a request for transmission of a cluster of the received content, are carried out.

As such processing is carried out, it is possible to distributively save content data to a device in the network by each cluster, which is generated by dividing the content. On the side of the device that receives distribution of the content, the address indicated by the server can be accessed to acquire the content data, distributively saved by each cluster.

According to this invention, it is possible to distributively save content data to a device in the network by each cluster, which is generated by dividing the content. On the side of the device that receives distribution of content, the address indicated by the server can be accessed to acquire the content data, distributively saved by each cluster, and distribution of the content data need not be directly received form the server. When requests for distribution of content data are simultaneously made, access from each device in the network can be dispersed. Even if the server does not have a simultaneous access function of high capability, content data can be distributed simultaneously to many users.

In this case, the server has an authentication database and the authentication database manages keys to encrypt the individual clusters at each storage place of each cluster indicated by the cluster database. Thus, the content data, distributively stored by cluster at each device, is encrypted with the individual keys, and security strength of the content data is increased.

Moreover, the data related to division into clusters stored in the content cluster list, the data related to an address at which each cluster is stored, stored in the cluster database, and the data related to encryption keys stored in the authentication database are sent as a cue sheet for reproducing a content, to the side of the device that requests the content data. Thus, the device requesting the content data can distributively acquire the content from the network on the basis of the data indicated on the cue sheet and can carry out decoding and satisfactory processing of the acquired content.

BRIEF DESCRIPTION OF THE DRAWINGS

FIG. 7 is an explanatory view showing an example of content database according to an embodiment of this invention.

FIG. 8 is an explanatory view showing an example of cluster list database according to an embodiment of this invention.

FIG. 9 is an explanatory view showing an example of cluster list key database according to an embodiment of this invention.

FIG. 10 is an explanatory view showing an example of cue sheet according to an embodiment of this invention.

FIG. 11 is an explanatory view showing an example of cue sheet header according to an embodiment of this invention.

FIG. 12 is an explanatory view showing an example of content information according to an embodiment of this invention.

FIG. 13 is an explanatory view showing an example of content information header according to an embodiment of this invention.

FIG. 14 is an explanatory view showing an example of cluster information according to an embodiment of this invention.

DETAILED DESCRIPTION OF THE PREFERRED EMBODIMENTS

An embodiment of this invention will now be described with reference to FIGS. 1 to 20.

Figure 1:
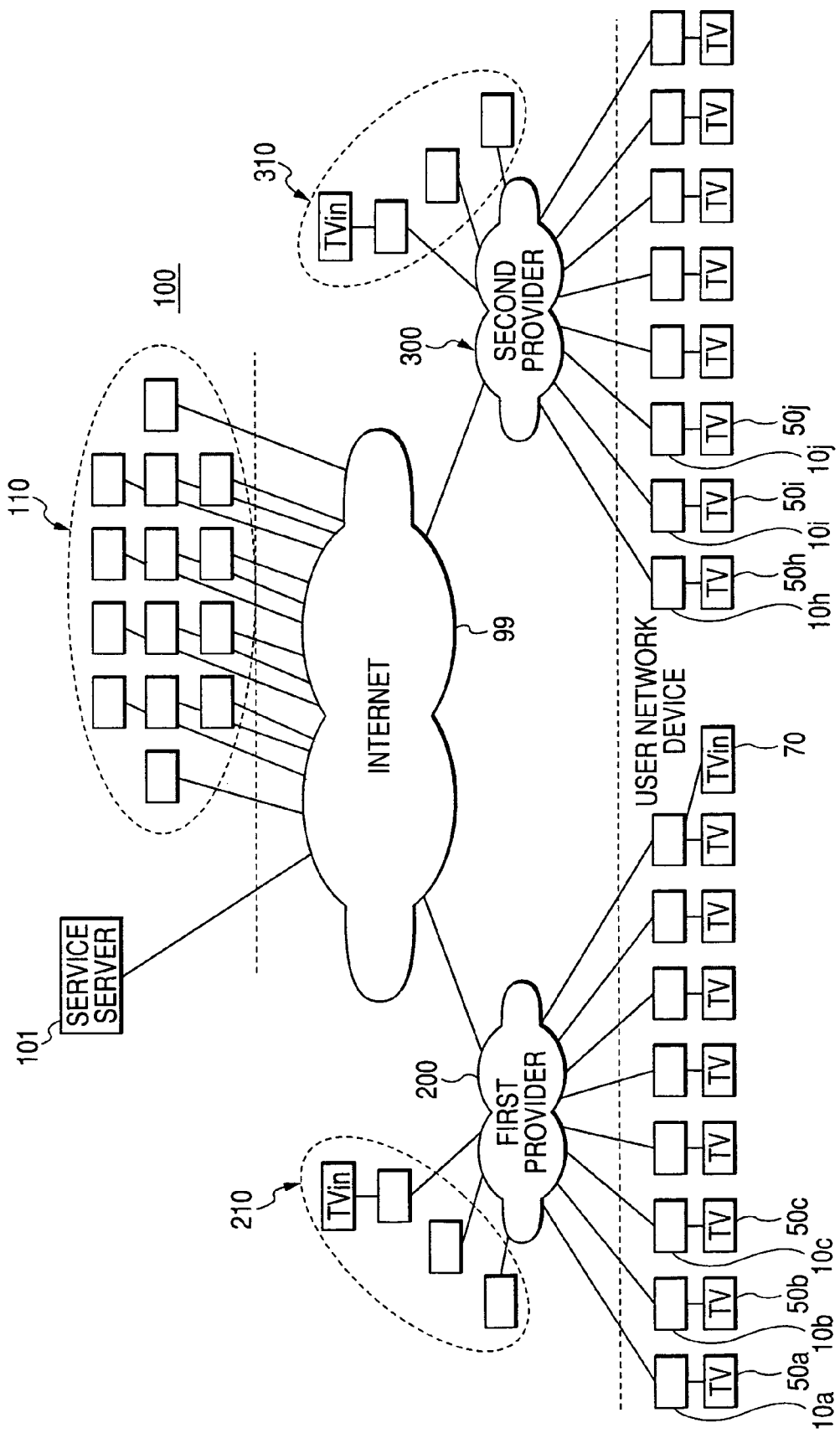
FIG. 1 is a structural view showing an exemplary structure of an entire network according to an embodiment of this invention.

FIG. 1 is a view showing an example of overall structure of a network system according to this embodiment. A service server 101 and a content server 110 are prepared as service providing side. Each of these servers can be connected to the Internet 99. Of the servers, one server may have plural functions or plural servers may share one function. For distribution of processing, the service server may be divided into plural devices. Many user network devices 10a, 10b, . . . are prepared as service receiving side. Application devices 50a, 50b, . . . are connected to the user network devices 10a, 10b, . . . , respectively. The user network devices 10a, 10b, . . . are connected to the Internet 99 via providers 200, 300. In this embodiment, a first provider 200 and a second provider 300 are shown. Other devices than the application devices, for example, a content input device 70 may be connected to the user network devices.

Provider storages 210, 310 may be arranged in the providers 200, 300. As the content server and the provider storages (similar to the content server but preferably installed near the providers in order to distribute network load), devices having functions similar to those of the user network devices can be used. However, changes such as increase in the capacity of a disk for saving data are carried out appropriately. All the content data stored in the user network devices are temporarily stored. If the content data are not reused after the lapse of a predetermined time, the content data are erased (volatile), but it is set that a part of the data stored in the content server and the provider storages is erased (non-volatile). This setting itself is instructed from the service server 101. The non-volatile setting is made on contents inputted from outside by using the content input device 70 or the like, such as charged contents. Also, volatile data areas are provided in the content server and the provider storages and are copied in accordance with the degree of use of the user network device (if many user use the user network device, the capability of the user network device that provides contents may be insufficient). As the provider storages are installed near the providers, the network load on the center side is reduced and the cost can be lowered.

As for the hardware structure for connection to the network, the user network devices, the content server and the provider storages have basically the same structure. The control processing structure and the structure for executing applications vary among the devices. In the system shown in FIG. 1, it is assumed that so-called video on demand is performed, that is, content data of a video provider or the like is distributed in response to a request from the user side. Each of the devices that are connected to the network and handle content data (that is, user network devices, content server, and provider storages) has a mechanism for connection to the network, a hard disk (HD) recording/reproducing unit as a storage unit for storing (saving) content data, and an encryption/decoding mechanism unit, as will be described later. On the hard disk, content data to be provided from the service provider is divided, encrypted and then stored, and processing to gather and reconstruct the content data from the other devices is carried out when a user receives service. As procedures for realizing this processing, a content registration procedure, a content acquisition procedure and an advance content distribution procedure are executed, as will be described later.

Next, the structure of each device connected to the network will be described. First, the outline of the functions of each device will be described. The service server 101 has an authentication database (for authentication of user network device and subscription/attributes of device), a content database (for management of contents), a content cluster list database (cluster list of contents), and a cluster list database (cluster list stored by user). As the content server, which is a server storing contents, a device having a structure equivalent that of the user network device, which will be described later, can be used. The user network device is a device having functions equivalent to those of CPE described in the conventional example. The user network device has a function of connecting to the network, a function of saving contents data and the like, and an encryption/decoding function. The content input device is a device for inputting contents. The user application device is made up of a device such as a video reproducing device, television receiver or audio receiver (radio receiver).

A content, which is a material to be provided such as a video program or audio program, is represented in the form of file. This content is handled by each minimum unit called cluster, which is generated by dividing the content. Also processing such as encryption/decoding, saving and the like is carried out by each cluster. Within one content, all the clusters have an equal size. The clusters, generated by dividing the content, are managed by a list called cluster list (cluster number sequence), which groups plural contents. As data are gathered in the order of cluster numbers, data of one unit of content is acquired. However, when the user network device issues a request, it is possible to designate offset (at a halfway part). In this embodiment, the service server sends instructions to the user network devices, the content server and the provider storages, using information called cue sheet for reconstructing contents. This cue sheet contains information such as the order in the cluster list, address information of the user network devices, and cluster keys.

Clusters, generated by dividing content data, will now be described. In this embodiment, a content is divided into equal units called clusters and handled by each cluster. The clusters are numbered and thus managed. To reproduce content data of one content is to array the clusters in the order of numbers. An array of plural of clusters is called cluster list. Transfer in the network and encryption are carried out with this unit. In the user network devices, the content server, the provider storages and the like, content data is stored and requested by this unit. In the cluster list, the clusters need not necessarily be arrayed consecutively in order and may be arrayed in the order of, for example, numbers 1, 2, 5, 8. However, the clusters are arrayed in the order from small to large numbers. When reconstructing the content data, a request for the content data by each cluster is issued to plural contents servers (or user network devices and provider storages) in which the content is saved, and the clusters are rearranged within the user network device. Encryption keys put on the data are different between the contents servers (or user device and provider storages) from which the clusters are received. The user network device decodes each encryption key and encrypts the data with its own encryption key. The purpose of encryption is to protect the contents data. The purpose of using different encryption keys between the content servers is to limit damage if case one of the encryption keys is leaked.

The procedures of such processing and information (IP address of counterpart device and encryption key of content) are sent from the service server. In this system, though data is encrypted and distributively stored in different devices, the service server monistically manages all the information about distribution and key information. Therefore, the possibility of leakage of the information is limited and security is maintained. In this system, the service server manages information to be sent to the user network devices, the content server and the provider storages, in a file called cue sheet in which the information is arrayed in the temporal order (from the leading part of the file).

As content distribution processing according to this embodiment, the user network device are connected to each other and transmission of contents, which is conventionally carried out by the server, is carried out by the user network devices. Thus, the burden on the server is reduced. Specifically, for example, as shown in FIG. 5, one server 1 (this server includes both the service server and the content server shown in FIG. 1) and 14 user network devices (CPEs) 2a to 2n for receiving distribution of contents from the server 1 are connected to a network, and seven user network devices 2a to 2g of them are receiving service.

In this case, according to this embodiment, content data is acquired mainly from the interconnected user network devices. In the example of FIG. 5, the first CPE 2b to receive distribution of content data receives the content data from the server 1 (content server), but the other CPEs sequentially transfer the data saved in the CPE 2b. In this case, for example, the content is bisected (that is, divided into two clusters) and one CPE receives the content from two CPEs (or server) at the maximum. Alternatively, the content may be divided into more clusters. However, if the number of divisions increases, the processing load on each CPE (user network device) increases accordingly. In the case where a part of the content is saved in the user's own device, the data can be complemented from the user's own device and the load on the network can be reduced further.

Figures 5, 6:
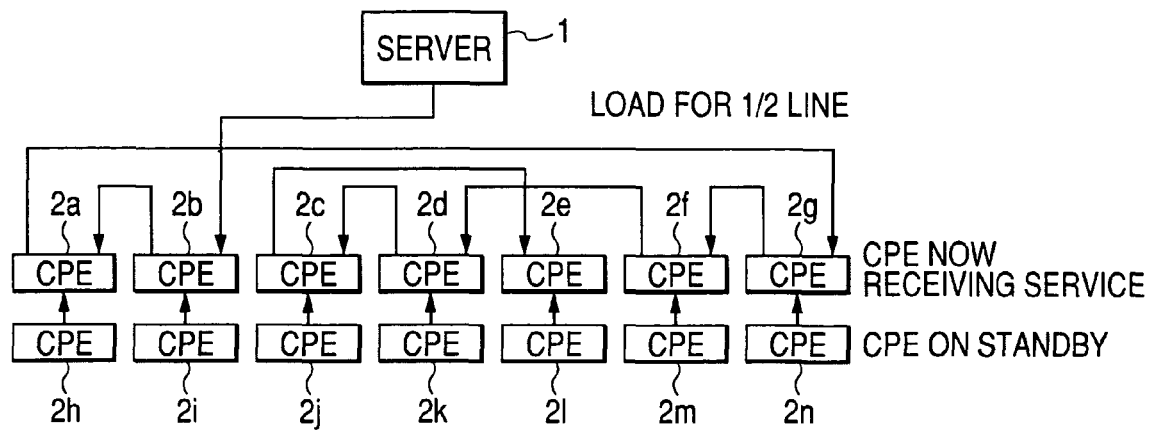
FIG. 5 is an explanatory view showing an example of service model according to en embodiment of this invention.
FIG. 6 is an explanatory view showing an example of authentication database according to an embodiment of this invention.

In the example of FIG. 5, most CPEs acquires contents from the other CPEs. However, depending on the saving state of the contents, the CPEs may not be able to acquire sufficient transmission. In such a case, the contents are received from the server. Moreover, as the CPEs receive contents, the CPEs save a part of the contents therein so as to respond to requests from the other CPEs. Thus, for a frequently requested content, many copies are produced and the burden on the server is reduced. On the other hand, for a less frequently requested content, it is like one-to-one server-client model, but the burden on the server is naturally light when there are few requests. Such a flexible mechanism enables correspondence to changes of requests even if excessive server investment is not made.

Next, an exemplary structure of the user network device, which is a CPE, will be described with reference to FIG. 2. In the user network device 10, a central control unit (CPU) 11, which is a control unit for controlling the operation of the entire user network device, a ROM 12 in which processing programs or the like of the user network device are stored, a RAM 13 used for data processing, a hard disk recording/reproducing unit 14 for saving content data or the like, a network controller 15 for connection to the network via a provider, and an AV port controller 16 for controlling input/output ports for video data and audio data (hereinafter referred to as AV ports) are protected by a mechanism of encryption function block unit (anti-tampering mechanism) 20.

When saving a content to the hard disk recording/reproducing unit 14, the content is sectioned and saved by each cluster, as already described above, and the clusters are encrypted with different encryption keys, respectively. Keys corresponding to the encryption are stored on the server side, which is different from this device, and the keys do not exist in the user network device except for the time of reproduction. For the network controller 15, application of a communication standard such as 100 BASE-T is assumed. As an output port connected to the AV port controller 16, for example, a port using an optical device for connection via an optical cable is desired so that it is difficult to set another device between this device and a device connected to the output port (video device, audio device or the like). Data is encrypted on this port, too, and then sent.

In this embodiment, the encryption function block unit (anti-tampering mechanism) 20 is provided as hardware having an anti-tampering mechanism. It has an encryption/decoding module unit 21 that executes functions of encryption and decoding. This encryption/decoding module unit 21 applies standard encryption, for example, what is called AES (Advanced Encryption Standard), prescribed by the National Institute of Standards and Technology (NIST). However, another encryption system such as triple-DES may be used if it has sufficient encryption strength. Also, independent encryption and decoding modules may be employed. A table 22 for saving encryption/decoding keys is connected to the module unit 21 and it saves one or more pairs of cryptograms. Aside from the encryption/decoding module unit 21, another encryption/decoding module unit 24 is provided. Again, a table 23 for saving encryption/decoding keys is connected to the encryption/decoding module unit 24, and it saves one or more pairs of cryptograms. The two encryption/decoding module units 21, 24 have basically the same processing structure. If the performance of one encryption/decoding module unit is enough, it is not necessary to provide two module units.

The encryption function block unit 20 has a central control unit (CPU) 25. This central control unit 25 carries out transmission/reception of keys to/from outside, management of the encryption/decoding module units 21, 24 and the key saving tables 22, 23 and the like. The central control unit 25 is the only unit that can directly write data to the key saving tables 22, 23. In the case of receiving a key from outside, a public key encryption system is used. Although no key system is prescribed, a processing program is read, for example, from a ROM 26 in the encryption function block unit 20 and processing is carried out using a RAM 27. The encryption function block unit 20 also has a function of sending back device ID stored in an ID storage unit 29 in the encryption function block unit 20 under the control of the central control unit 25 when an inquiry is made from outside.

The provider information contents stored in the ROM 26 in the encryption function block unit 20 include, for example, response to an inquiry for ID from outside, response to a key storage request from outside according to the public key system, response to a data processing (decoding and encryption) request from outside, and the like. Since the processing memory such as the RAM 27 exists within the encryption function block unit 20, estimation of the operation from outside can be prevented. It is desired that the ID storage unit 29 has a mechanism using a non-volatile memory that cannot be falsified by the user. Moreover, a random number generator 28 is provided in the encryption function block unit 20, and it is used for encryption processing. Higher security is acquired if this random number generator 28 generates random numbers by using a natural phenomenon, for example, by using IC noise. However, random numbers may also be generated by calculation or within the central control unit 25.

Next, the structure of the user application device connected to the user network device will be described with reference to FIG. 3. The user application device is a device used the user to receive service. While a device such as a tuner for receiving television broadcast is considered in this embodiment, a device such as a television receiver or audio receiver (radio receiver) may also be used. In this embodiment, a video converter device 50 is shown as the user application device.

The video converter device 50 has an encryption function block unit (anti-tampering mechanism) 60, and a decoding module unit 61 arranged in the encryption function block unit (anti-tampering mechanism) 60 performs decoding processing. Here, as in the user network device, standard encryption, for example, what is called AES, prescribed by the National Institute of Standards and Technology (NIST) is applied, but another encryption system such as triple-DES may be used if it has sufficient encryption strength. Since only one type of key is used, a key saving memory is included therein. To control transmission/reception of keys to/from outside, reception of keys according to the public key encryption system and the like, the video converter device 50 has a central control unit (CPU) 62. The video converter device 50 also has an ID storage unit 51, a ROM 63 having programs stored therein, a RAM 64 as a work memory and stack memory for operation, and a random number generator 65. The programs stored in the ROM 63 include functions of response to a key storage request from outside according to the public key system, response to a data processing (decoding) request from outside and the like. Since the RAM 64 is provided within the encryption function block/anti-tampering mechanism unit 60, the operation cannot be estimated from outside. Higher security is acquired if the random number generator 65 uses keys of the public key encryption system and generates random numbers by using a natural phenomenon, for example, by using IC noise. However, random numbers may also be generated by calculation or within the central control unit 62.

As the structure on the outside of the encryption function block unit (anti-tampering mechanism) 60, an AV port controller 53, which is a bidirectional communication port for connection to a video device or audio device, an A/V converter 54 for video output and audio output ports, and a user interface 55 are provided. To the video output and audio output ports to which signals converted by the A/V converter 54 are outputted, a receiver (video display device), an audio reproducing device and the like are connected. The user interface 55 is formed by a keyboard, a remote controller or the like. This video converter device 50, which is a user application device, is used for receiving service and has a simple browser function to access the server, select a content and request for the content. A saving function is not provided, in principle, and a buffer that is only necessary for decoding can be provided. In principle, stability of streams is guaranteed on the side of the user network device. However, since there is a possibility of trouble such as interruption of data, trouble processing is necessary.

Next, an exemplary structure of the content input device will be described with reference to FIG. 4. The content input device is a device that inputs content data to the system according to this embodiment, through the AV port of the user network device (or content server). Here, a function of inputting video data will be described as an example. A content input device 70 shown in FIG. 4 has an encryption function block/anti-tampering mechanism unit 80, and an encryption module unit 81 arranged in the encryption function block unit (anti-tampering mechanism) 80 performs encryption processing. Here, as in the user network device, standard encryption, for example, what is called AES, prescribed by the National Institute of Standards and Technology (NIST) is applied, but another encryption system such as triple-DES may be used if it has sufficient encryption strength. Since only one type of key is used, a key saving memory is included therein. To control transmission/reception of keys to/from outside, reception of keys according to the public key encryption system and the like, the content input device 70 has a central control unit (CPU) 82. The content input device 70 also has a ROM 83 having programs stored therein, a RAM 84 as a work memory and stack memory for operation, an ID storage unit 85, and a random number generator 86. The programs stored in the ROM 83 include functions of response to a key storage request from outside according to the public key system, response to a data processing (decoding) request from outside and the like. Since the RAM 84 is provided within the encryption function block unit (anti-tampering mechanism) 80, the operation cannot be estimated from outside. The ID storage unit 85 is a non-volatile memory storing the device ID and has a mechanism that cannot be falsified by the user. The ID storage unit 85 is housed within the anti-tampering mechanism in order to prevent posing. Higher security is acquired if the random number generator 86 uses keys of the public key encryption system and generates random numbers by using a natural phenomenon, for example, by using IC noise. However, random numbers may also be generated by calculation or within the central control unit 82.

The content input device 70 according to this embodiment also has a user interface 71, an AV port controller 72 to which a bidirectional communication port (AV port) is connected, and an A/V converter 73 for video input and audio input ports. The user interface 71 is formed by a remote controller, a keyboard or the like, and is used, for example, for registering contents to the server. The content input device 70 according to this embodiment is used for registering contents to the system of this embodiment. With respect to contents, license information, accounting information, expiration date, and form of provision (limitation of device, insertion of advertisement and the like) are registered to the service server. This operation itself is explicitly carried out using the user interface. Content data is distributed every cluster list and stored into the content server on the center side. In this case, an attribute (saving attribute) of not being deleted is added to each cluster. Content data is also saved into the provider storage, when necessary. Basically, content data is not saved into the user network device at home. In the case of saving content data to the content server, if two or more copies are prepared, strength against trouble of the device can be increased and processing of contents that are frequently accessed can be reduced.

Next, the structure of the content server will be described. Fundamentally the same structure as that of the user network device 10 shown in FIG. 2 can be used. However, disk capacity, calculation capability, encryption processing capability and the like may be made higher than in the user network device, and the AV port controller 16 and the like may be omitted. To distinguish the content server from the user network device, a reserved number may be used as the device ID, or the network address may be used. Also, both of these may be used. In principle, unlike the user network device, the content server has a task of storing non-volatile content data (in accordance with an instruction form the server).

Next, the structure of the service server will be described. The service server manages the present system. While only one server is defined in the example of FIG. 1, the load may be distributed to plural servers if there are many requests. The service server carries out management of devices, management of traffic (each transfer), management of keys, and management of service. The service server has databases corresponding to such management, that is, "authentication database," "content database," "cluster list database," and "cluster list key database." In response to requests from the devices of this system via the network, the service server performs control in sending and receiving data in this system, such as authentication of device, confirmation of user subscription and accounting, registration of content data, preparation of content data list and correspondence thereto, duplication and deletion of content data and management thereof, management of keys of content data, and preparation of cue sheet. Such control is used in each of procedures that will be described later, that is, "content registration procedure," "content acquisition procedure," and "advance content distribution procedure." Next, each database managed in the service server will be described. The values in databases shown in the drawings are only examples.

FIG. 6 is a view showing an example of authentication database. The authentication database gives a management number to device ID, IP address, and subscription information (course, time limit and the like) of each user network device, and thus manages them. The IP address may be updated. The device ID is used for authentication, which is confirmation when the device is connected to this system. Subscription contents are thus decided and operations that the device is allowed to perform are decided. In this authentication, the IP address is updated. This IP address is used when preparing a cue sheet. Information representing validity of the IP address of the device (update time of IP address or the like) may also be loaded. To prevent posing, the device ID is not made public (i.e., the device ID is protected by the anti-tampering mechanism in the user device and even the user is not notified of the device ID). When preparing a cue sheet, the device ID is converted to IP address and sent.

FIG. 7 is a view showing an example of content database. It includes content number, title, search keyword, cluster size (bytes or the like), subscription information (attributes), and explanation (html or the like). This content database is a list of contents managed by the service server. The content number may be a non-sequential number like ID. The title and search keyword are used when preparing the list of contents. The cluster size defines the size of clusters of the corresponding content. In principle, this function is decided by the size of the content. That is, the size is small for a small volume of data such as music data, and the size is large for a large volume of data such as video data. The subscription information permits access and defines the price in accordance with the authentication of the user.

FIG. 8 is a view showing an example of cluster list database. It includes content number, total number, and value of each cluster. The content numbers in the cluster list database correspond to those in the "content database." It defines a cluster list for each content. The total number is the number of cluster lists of the corresponding content. Cluster 1, cluster 2, . . . are cluster definitions. They are defined by numerical value arrays representing clusters. The cluster lists are generated when the content is registered by the service server. The clusters included in the cluster list may or may not overlap. If the clusters overlap, redundancy increases network durability.

FIG. 9 is a view showing an example in the case where a cluster list key database is prepared for each content. This table is prepared for the number of contents. Cluster numbers correspond to cluster 1, cluster 2, . . . in the "cluster list database" and indicate which device stores the cluster list. ID (numerical value)/KEY (numerical value) is device ID number and encryption key of the device. When preparing a cue sheet, ID is converted to IP address by using the "authentication database" and ID itself is not sent. Since priority given to device changes according to the operating state or the like, the priority is updated in accordance with a report from the user network device.

Next, the structure of the cue sheet will be described. FIG. 10 is a view showing an exemplary structure of the cue sheet. As shown in FIG. 10, the cue sheet includes a cue sheet header, content information 1, content information 2, . . . , content information n (n being an arbitrary integer). The content information is arrayed from the leading part of a file. It can also be considered that the content information is arrayed in time series. The cue sheet is prepared and issued by the server, but the encryption key information is encrypted with a public key issued by the user network device and thus sent out. This information is stored as it is to the RAM 13 of the user network device, and it is sent and registered to the encryption function block/anti-tampering mechanism unit 20 when necessary. In the cue sheet header, information related to the entire cue sheet is essential. In this embodiment, since plural contents are decoded to produce a program, a plural number of contents are prepared. The content information is arrayed in the order of time base and sequentially acquired. This is useful, for example, for inserting advertisement as in television broadcast, or for sending an omnibus program such as a news program/music program that suites the user 's preference.

FIG. 11 shows an exemplary structure of the cue sheet header. In the cue sheet header, information related to the entire cue sheet is described such as the number of content information items, instruction, and other information. The number of content information items represents the number of content information items following this part. In the part of instruction, an instruction to receive and transmit to the AV port, to simply receive and prepare a copy, to receive from the AV port and prepare a cluster list, to perform multicast reception, or the like, is written.

FIG. 12 shows an exemplary structure of the content information. The content information includes a content information header and an array of many cluster information items. The header stores information related to the entire clusters. The cluster information includes information of each cluster.

FIG. 13 shows an exemplary structure of the content information header. In the content information header, content attribute, cluster size, saving encryption key, and other information are arranged. As the content attribute, an attribute related to the content such as image or music is described. However, the content attribute is not necessarily essential, depending on the system. As the cluster size, the size of one cluster is described. Generally, it is described by byte. The saving encryption key is used as an encryption key for storing data in the user network device and for temporarily storing data for a stream buffer. Data of each cluster is encrypted with the public key of the user network device that has been sent to the server in advance.

FIG. 14 shows an exemplary structure of the cluster information. The cluster information includes content number, list number, cluster array, time information, saving flag, and plural IP/Keys. As the cluster information, information related to the destination of data (another user network device) is described. As the content number, the content number in the content database is used. However, ID may also be used. The list number is acquired from the cluster list database. The numbers arrayed as cluster 1, cluster 2, . . . are equivalent to the list numbers. Using the content number and list number, data of the counterpart user network device (or content server) is specified. The cluster array is a number array acquired from the cluster list database. This number is a number in the entire content. As the saving flag, an instruction to save or delete this list is written. "Not to save," "to temporarily save," "to permanently save," "to delete" and the like are prepared as specific instructions. If the instruction to temporarily save is issued, the list is saved for a predetermined time, and if no request is made during this time, the list is deleted. The instruction to permanently save is prepared for the content server. In this case, the list is not deleted if the instruction to delete is not issued. Finally, the instruction to delete is prepared, in principle, for deleting the permanently saved list.

Each of the plural IP/Keys is a pair of IP address and key of another user network device (or content server), in which the cluster list of each number is saved. The plural IP/Keys are prepared in order to receive a content from another device when the counterpart user network device is off or is providing another service and cannot send out the content. On the basis of this information, the user network device itself searches for a terminal that can send out the content. This reduces the burden on the service server. Moreover, since information of network status of the counterpart device (no response or the like) is reported later to the service server, the service server can grasp the network status without confirming itself. However, when the instruction to perform multicast reception is received, the IP address is the multicast address from which data is received (this, too, is included in the category of IP addresses).

Figure 20:
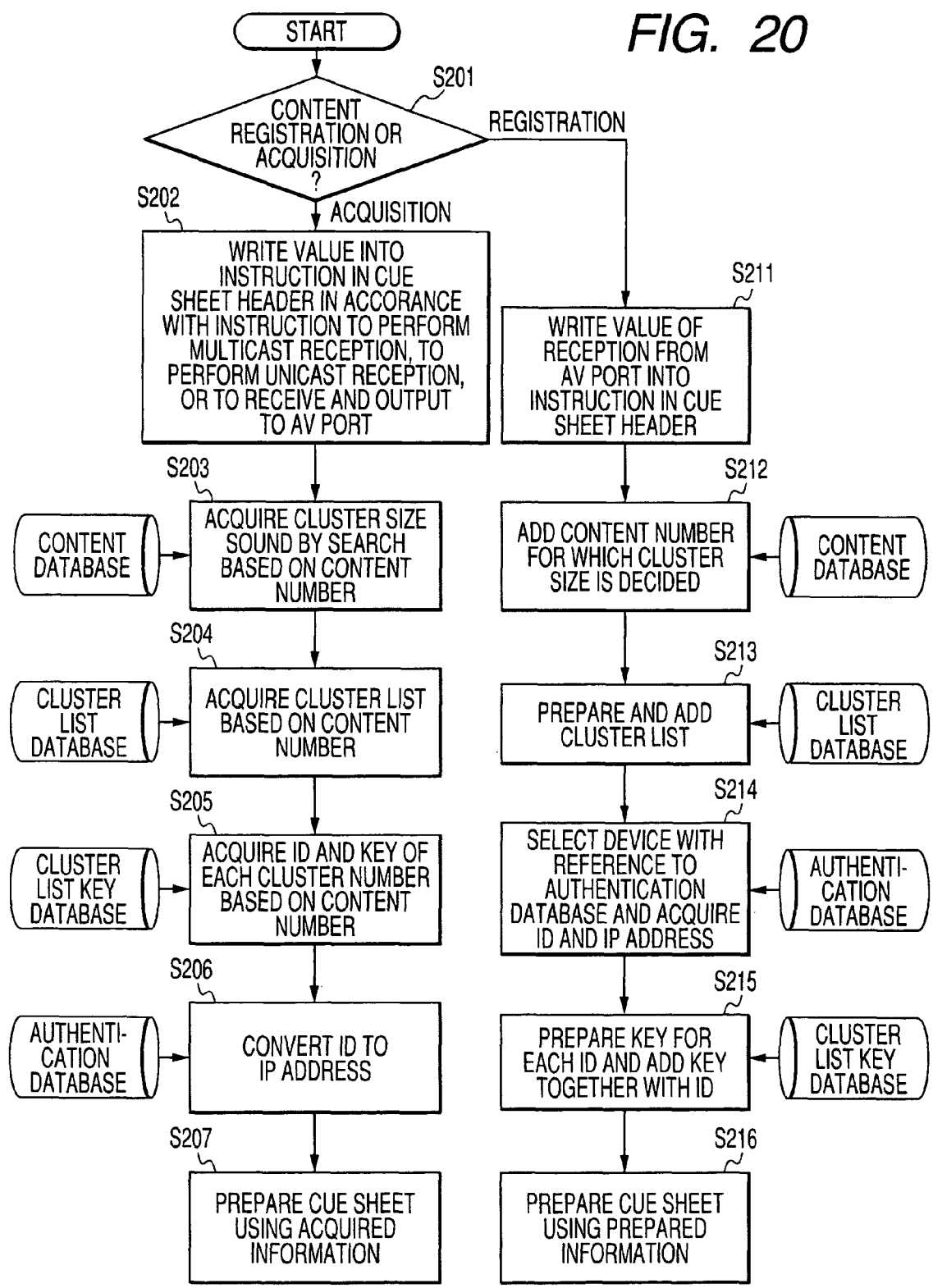
FIG. 20 is a flowchart showing an example of cue sheet preparation processing according to an embodiment of this invention.
Figure 21:
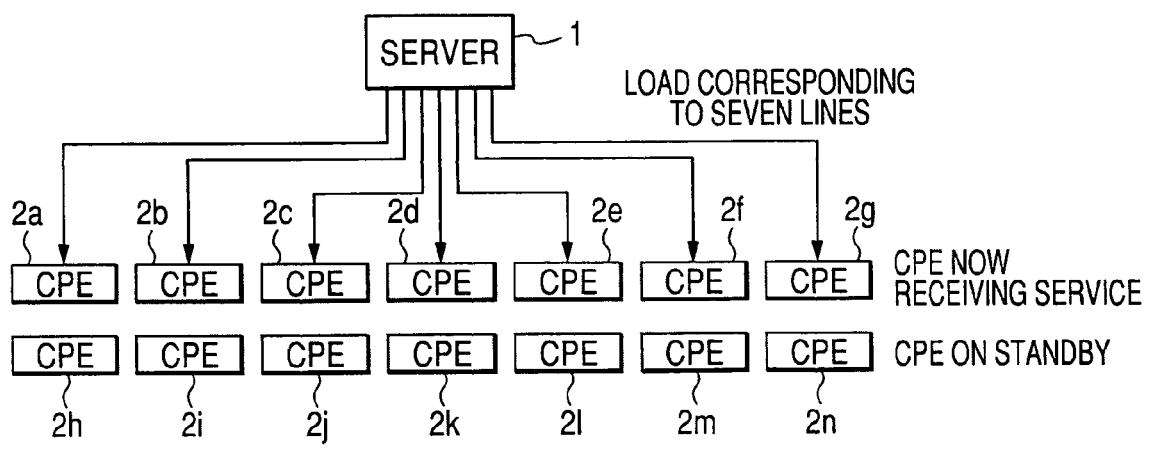
FIG. 21 is an explanatory view showing an example of conventional service model.

Next, processing by the service server to prepare the cue sheet constructed as described above will be described with reference to the flowchart of FIG. 20. In preparing a cue sheet, processing differs between content registration and content acquisition. First, which processing is to be performed is judged (step S201). Then, in the case of content acquisition, the processing shifts to step S202 and a value is written into the part of instruction in the cue sheet header in accordance with an instruction to perform multicast reception, to perform unicast reception, to output to the AV port or the like. Then, referring to the content database, search based on the content number is performed to acquire the cluster size (step S203). Next, referring to the cluster list database, the cluster list is acquired on the basis of the content number (step S204). Next, referring to the cluster list key database, ID and key of each cluster number are acquired on the basis of the content number (step S205). Next, referring to the authentication database, ID is converted to IP address (step S206). Then, a cue sheet is prepared using the acquired information (step S207).

For a number on which it is determined at step S201 that processing of content registration is to be performed, the processing shifts to step 211 and a value indicating reception from the AV port is written into the part of instruction in the cue sheet header. Next, the cluster size is decided and a content number is added to the content database (step S212). Next, a cluster list is prepared and added to the cluster list database (step S213). Next, a device is selected with reference to the authentication database and ID and IP address are acquired (step S214). Next, a key is prepared for each ID and added together with ID to the cluster list key database (step S215). Then, a cue sheet is prepared using the prepared information (step S216).

The cue sheet thus prepared is sent from the service server to each device through the network.

Figure 15:
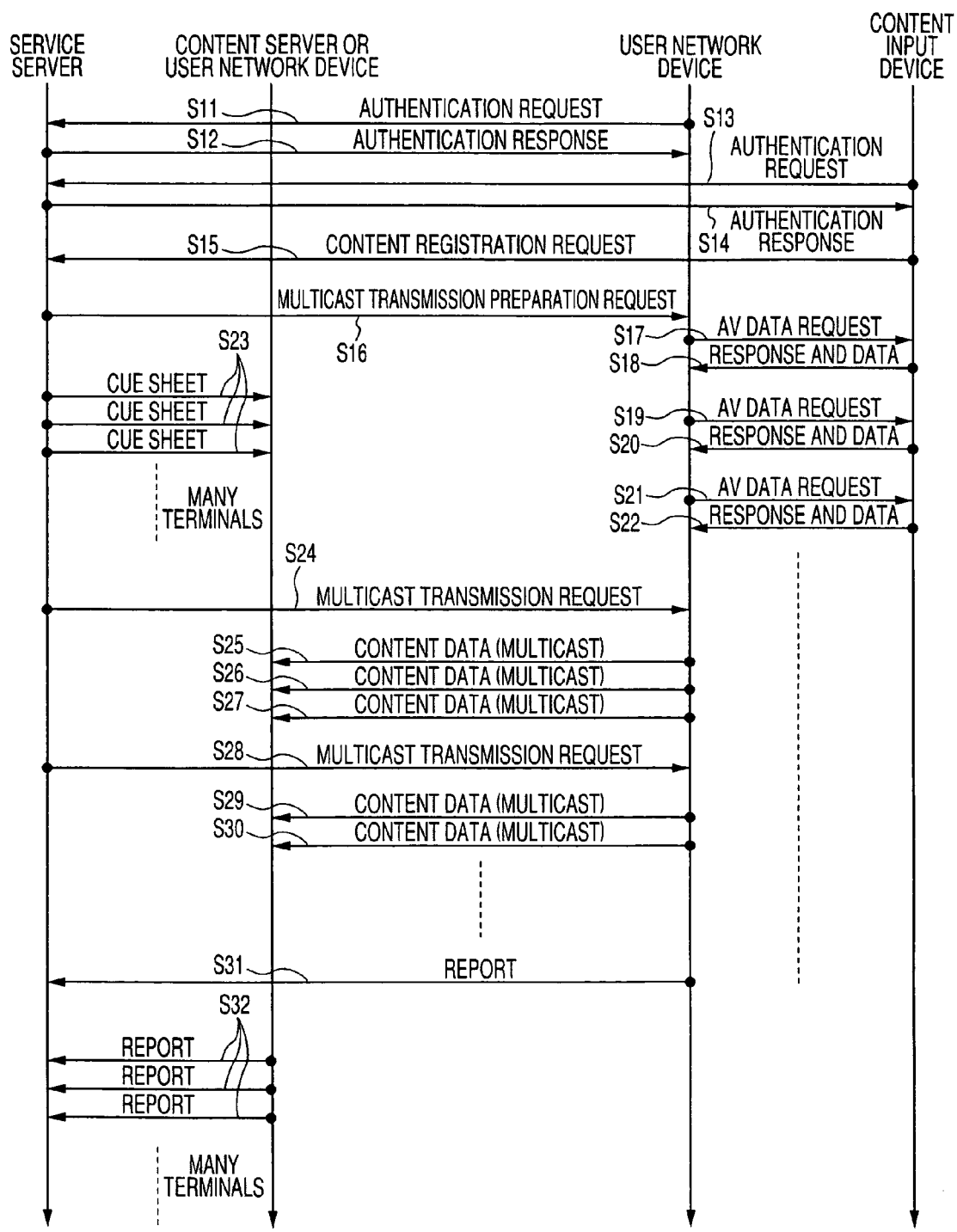
FIG. 15 is a sequential view showing an example of content registration procedure (example of multicast) according to an embodiment of this invention.
Figure 16:
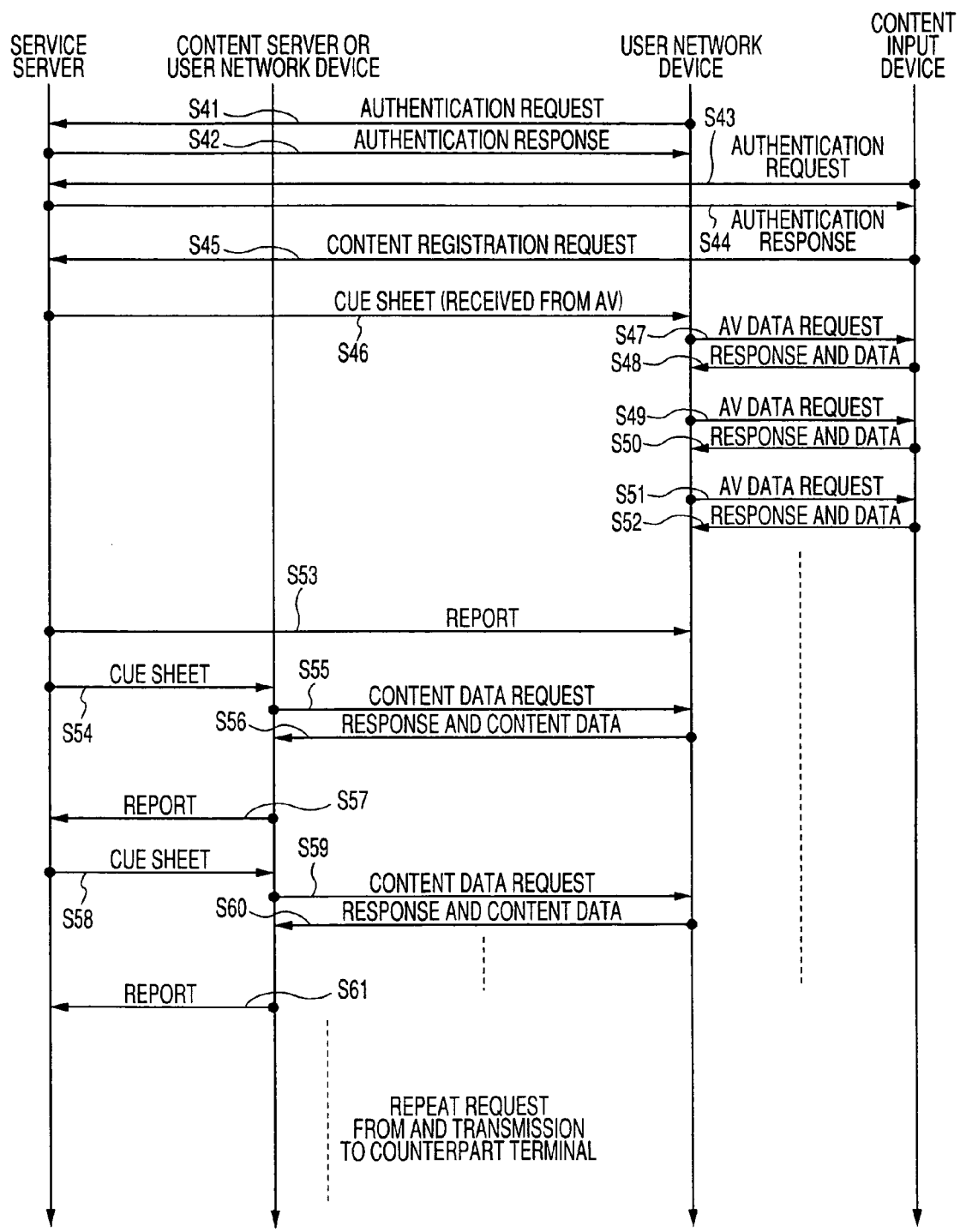
FIG. 16 is a sequential view showing an example of content registration procedure (example of unicast) according to an embodiment of this invention.

Next, the content registration procedures executed in the system of this embodiment will be described with reference to FIGS. 15 and 16. FIG. 15 shows the content registration procedure in the case of multicast. FIG. 16 shows the content registration procedure in the case of unicast. The content registration is carried out, for example, by connecting the content input device to the AV port of the user network device or the content server. Since the content input device performs encryption for the AV port, encryption processing is performed.

Referring to FIG. 15, the registration procedure by the user in the case of multicast will now be described. First, the user network device is connected to the network, and the user network device and the content input device are connected to each other. The power of these devices is then turned on. Then, authentication is performed between the user network device and the service server (steps S11, S12). This authentication processing may be started, for example, by connection of the device. However, the switch may be turned on to start the authentication processing, if necessary. In this authentication processing, the service server confirms ID of the user network device in the "authentication database." Next, authentication is performed between the content input device and the service server via the user network device (steps S13, S14). In the subsequent processing, communication to and from the content input device is always performed via the user network device. The service server confirms ID of the content input device in the "authentication database."

Next, the user carries out an operation of content registration, using the content input device, and the content input device performs additional content registration to the service server (step S15). In this processing, the service server registers the content to the "content database." Next, the service server sends an instruction to prepare for transmission of content to the content input device (step S16). In accordance with this transmission preparation request, the user network device sequentially issues an AV data (content data) request to the content input device (steps S17, S19, S21, . . . ) and causes the content input device to sequentially transmit a response to the request and content data (steps S18, S20, S22, . . . ). The service server issues in advance a reception instruction to content servers where the content is to be saved (step S23).

Next, the service server sends a content transmission request to the user network device (step S24), and the content stored in the user network device is transmitted in multicast to plural content servers (steps S25, S26, S27). Then, a transmission request (step S28) and transmission in multicast (steps S29, S30, . . . ) are repeated. When the transmission is completed, the user network device transmits a report to the service server (step S31), and also the content servers (or user network devices) that received the content transmit a report (step S32). When the transmission is completed, the content input device may be disconnected.

In the case of unicast, as shown in FIG. 16, first, the user network device is connected to the network, and the user network device and the content input device are connected to each other. The power of these devices is then turned on. Then, authentication is performed between the user network device and the service server (steps S41, S42). In this authentication processing, the service server confirms ID of the user network device in the "authentication database." Next, authentication is performed between the content input device and the service server via the user network device (steps S43, S44). Then, the service server confirms ID of the content input device in the "authentication database."

Next, the user carries out an operation of content registration, using the content input device, and the content input device performs additional content registration to the service server (step S45). In this processing, the service server registers the content to the "content database." Next, the service server sends an instruction to prepare for content transmission to the content input device (step S46). In accordance with this transmission preparation request, the user network device sequentially makes an AV data (content data) request to the content input device (steps S47, S49, S51, . . . ) and causes the content input device to sequentially transmit a response to the request and content data (steps S48, S50, S52, . . . ). When the preparation at the user network device is completed, a report is sent to the service server (step S53).

Next, the service server sends a cue sheet to the content server (or user network device, but in the following description, it is the content server) where the content is to be saved (step S54). The content server makes a content data request to the user network device (step S55) and causes the user network device to transfer a response to the request and content data of one unit (one cluster) to the content server (step S56). At the content server, every time content data of one cluster is received and saved, a report is sent to the service server (step S57) and receives the next cue sheet (step S58). Then, a content data request (step S59) from the content server to the user network device, transfer of a response to the request and content data of one cluster (step S60), and transmission of a report (step S61) are carries out repeatedly until all the content data is transferred.

Whichever of the multicast transmission shown in FIG. 15 and the unicast transmission shown in FIG. 16 may be carried out, and it is preferred that each user network device and content input device can support both transmissions. However, in the case of multicast, a content server indicated in advance by the service server receives the content and saves a fragment of the content indicated in advance by the service server. In the case of unicast, the user network device temporarily stores the content, then fragments the content, and transmits each fragment to a content server indicated by the service server. It takes longer than in the case of multicast, but more secure transmission processing is carried out.

Figure 17:
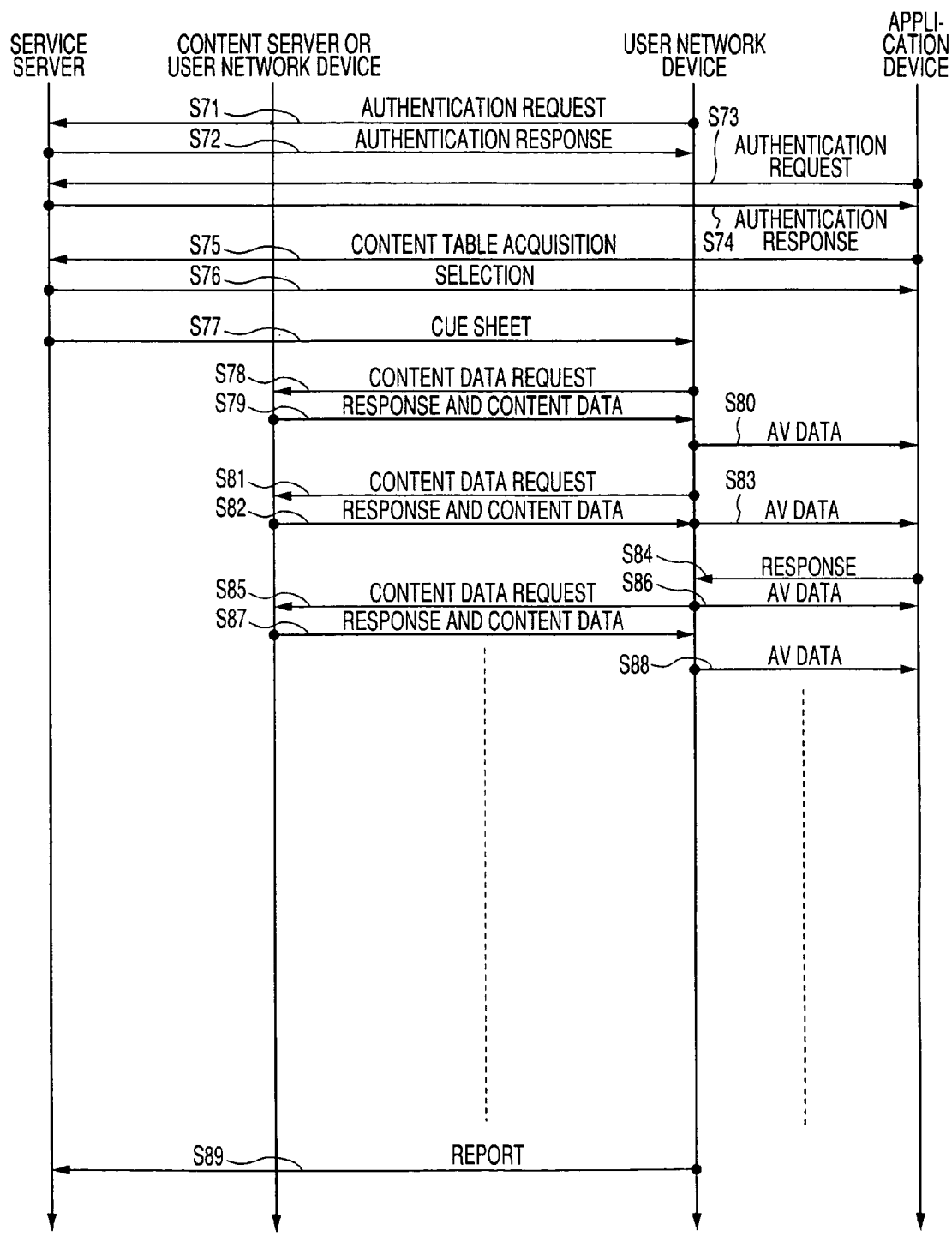
FIG. 17 is a sequential view showing an example of content acquisition procedure according to an embodiment of this invention.

Next, the content acquisition procedure will be described with reference to FIG. 17. When receiving a content, the user network device receives fragmented content data from plural user network devices or content servers and reconstructs the content. First, the user network device is connected to the network, and the user network device and the application device are connected to each other. The power of these devices is then turned on. Then, authentication is performed between the user network device and the service server (steps S71, S72). Generally, the authentication operation is started by the connection, but the authentication operation may be started by turning on the switch, when necessary. In this authentication processing, the service server confirms ID of the user network device in the "authentication database." Next, authentication is performed between the application device and the service server via the user network device (steps S73, S74). In the subsequent processing, the communication to and from the application device is always carried out via the user network device. In this authentication processing, the service server confirms ID of the application device in the "authentication database."

Next, the user acquires a content list by using the application device. To do this, the application device acquires the list from the content database of the service server (step S75). The list is displayed or presented otherwise, and the user selects a content, and the application device requests the service server to provide the content (step S76). The service server sends a "cue sheet" to the user network device and issues an instruction to reproduce from the AV port (step S77). The "cue sheet" in this case is prepared using the "cluster list database," "cluster list key database," and "authentication database."

Next, the user network device sequentially requests the other user networks devices (plural user network devices) to provide the content data in accordance with the "cue sheet" (steps S78, S81, S85, . . . ) and acquires fragments of the content (steps S79, S82, S87, . . . ). When receiving the content from the other user network devices or content servers, the user network device may request plural counterpart devices to provide even the same cluster list. In preparation for possible disconnection of communication during actual reception, the user network device may continuously inquire whether the other user network devices can provide service or not, and may instantly switch the connection when trouble occurs. The fragments of the content are encrypted with different keys for the counterpart user network devices, respectively. The keys themselves are registered into the user network device in accordance with the indication in the "cue sheet." The cue sheet itself is encrypted and stored with a public key. This cue sheet is sent and registered as it is to the CPU in the encryption function block. Therefore, the actual keys are not arranged as plaintext in a part that can be cracked. Plural keys can be handled, and for decoding the fragments of the content, entry numbers of keys are used for control.

When acquisition of the fragments is completed (or fails or is interrupted), the user network device sends the result as a report to the service server (step S89). On the basis of this information, the service server updates the priority or the like of the cluster list database and improves the certainty of data (it is deleted if failure or interruption often occurs). The service server instructs the user network device that is now receiving data, to save the cluster list at proper timing, and updates the cluster list database at the same time. The user network device encrypts the received fragments of the content and saves them to a memory or HD. A key for storage is indicated by "saving encryption key" of the "content information header" in the "cue sheet." Since this key, too, is encrypted with the public key issued by the user network device itself, only the internal CPU of the anti-tampering mechanism can decode the key. The encryption keys are saved in the user network device. In this case, it is desired that a cluster list number that is never to be saved is prepared (that is, no instruction to save) in accordance with combinations of content and user network device so that saving of all data in one device based on plural requests is avoided.

The content acquired and temporarily saved by the user network device is reconstructed, decoded, then encrypted for the AV port, and sequentially sent to the application device (steps S80, S83, S86, S88, . . . ), and the application device is caused to send back a response (step S84). The application device decodes the received content data and converts the content data to video, audio or the like.

Figure 18:
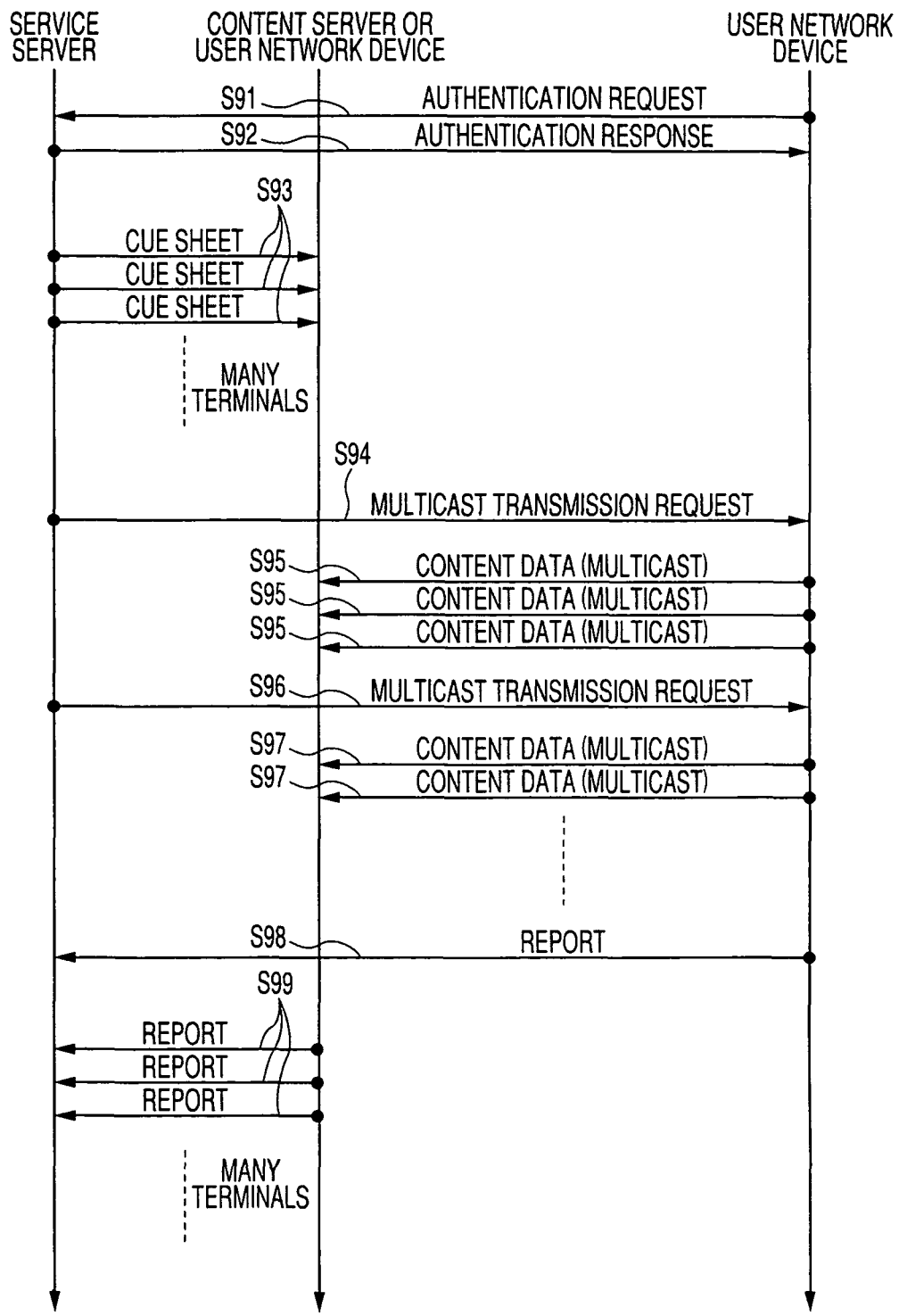
FIG. 18 is a sequential view showing an example of advance content distribution procedure (example of multicast) according to an embodiment of this invention.
Figure 19:
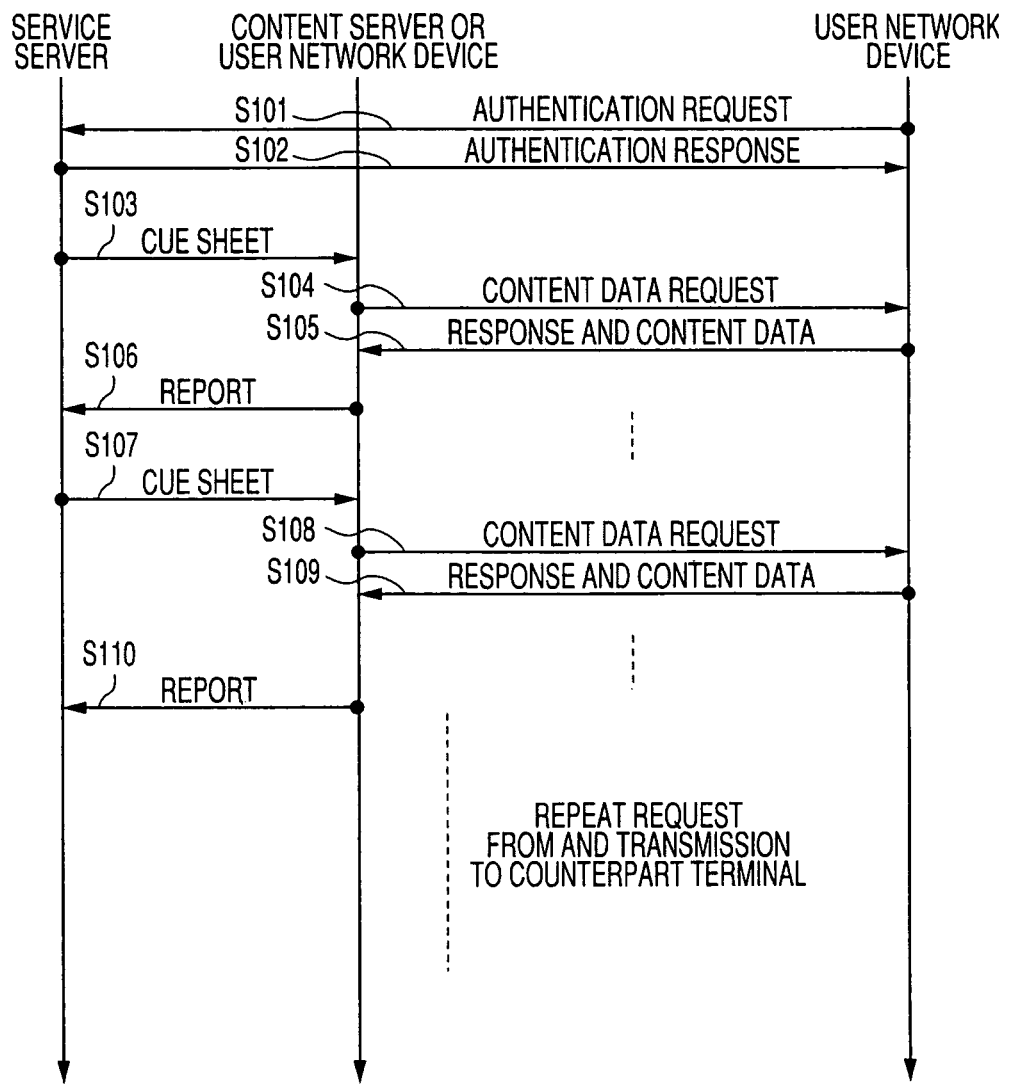
FIG. 19 is a sequential view showing an example of advance content distribution procedure (example of unicast) according to an embodiment of this invention.

FIGS. 18 and 19 are views showing the advance content distribution procedures. Generally, it is anticipated that accesses are concentrated at the start of service of distributing contents and that the capability of the content server may be insufficient. Therefore, contents may be stored in the user network device by a technique of advance distribution. By storing contents in the user network device in accordance with the user's preference and reservations, it is possible to save and supplement the user 's circuit band. Particularly when the user 's circuit bandwidth is narrower than that of the contents, storage by reservation is essential. It is also used for preparation of copies to deal with increase in the number of requests during service. In this embodiment, two types of advance distribution techniques, that is, advance distribution in the case of multicast (example shown in FIG. 18) and advance distribution in the case of unicast (example shown in FIG. 19), are considered.

In the case of multicast, many user terminals can receive data at a time and the network band is not wasted. Therefore, multicast is most suitable for distribution. Referring to FIG. 18, the procedure will now be described. First, authentication processing is performed between the user network device having a content and the service server (steps S91, S92). In this case, for example, a content provision request is issued to the user network device holding the content. The user network device sends back a response of OK or NG. The service server issues a "cue sheet" containing an instruction to perform multicast reception to the receiving user network device and thus prompts the receiving user network device to receive the content (step S93). When preparation is completed, the service server issues to the user network device an instruction to sequentially transmit the content (steps S94, S96, . . . ) and causes the user network device to transmit the content data by multicast (steps S95, S97, . . . ), while controlling to prevent application of high load on the traffic. The receiving content server (or user network server or provider storage) receives and saves the data, and issues a report of the result of reception to the service server (step S99). In this case, in ordinary content data reception, data is issued in an order defined by the cluster list, but in the case of multicast reception, data is issued sequentially from 1. Therefore, in saving, the data is intermittently saved in accordance with the indication of the cluster list. The service server updates the "cluster list database" on the basis of the report.

In the case of receiving advance distribution because of limitation of the network or in accordance with the user's convenience (instruction), the following processing is performed. In the case of receiving advance distribution in accordance with the user's instruction, it is assumed that the service server has received the instruction from the user in advance. First, authentication processing is performed between the user network device having the content and the service server (steps S101, S102). The service server issues a "cue sheet" containing a reception instruction to the receiving user network device and prompts the receiving user network device to receive the content (step S103). The "cue sheet" is prepared using the "cluster list database," "cluster list key database," and "authentication database." The user network device (or content server or provider storage) on the receiving side sequentially request other user network devices (plural user network devices) for the content data in accordance with the "cue sheet" (steps S104, S108, . . . ) and acquires fragments of the content (steps S105, S109, . . . ) and saves the fragments to a hard disk or the like. Also in this case, the receiving user network device can request plural counterpart devices to provide the same cluster list, then continuously inquire whether the other user network devices can provide service or not, in preparation for possible disconnection of communication during actual reception, and instantly switch the counterpart when trouble occurs. When acquisition of the fragments is completed (or fails or is interrupted), the user network device on the receiving side sends the result as a report to the service server (steps S107, S110, . . . ). On the basis of this information, the service server updates the priority or the like of the cluster list database and improves the certainty of the data (it is deleted if failure or interruption often occurs). The user network device encrypts the received fragments of the content and saves them to a hard disk or the like. A key for storage is indicated by "saving encryption key" of the "content information header" in the "cue sheet." Since this key, too, is encrypted with the public key issued by the user network device itself, only the internal CPU of the anti-tampering mechanism can decode the key.

As described above, as content distribution is carried out using the system according to this embodiment, data communication is carried out closely in the network. Therefore, the load is not applied locally and the network resource can be effectively utilized. Moreover, since data communication is distributed, the load on the content server and the network load are reduced and excessive investment can be restrained.

Also, while all the communications are encrypted, arithmetic operation for encryption is carried out by each user network device and therefore no specific server is burdened. Since more copies are produced for more frequently requested contents, the service capability spontaneously increases in accordance with increase in the number of requests. Moreover, since the content saving/transmission capability and the encryption operation capability increase proportionally to increase of the network, the network (server facilities) can be easily designed and managed.

Also, since many copies of contents are produced, the system is durable against trouble of data damage. As copies of contents are put in many places in the networks and a network in good state can be selected, the system is durable against network trouble. When generating copies of contents, the contents are encrypted with keys unique to the individual network devices, respectively. Therefore, even if one of the keys is analyzed, it cannot be used for other content data and higher security is achieved. Moreover, since contents are fragmented and saved into plural devices and the plural devices are necessary for stealing the data, the security is physically improved. When generating copies of contents, a part that is never to be saved is intentionally prepared in accordance with the combination of content and device. Therefore, it is difficult to acquire all the encrypted data. This increases the security strength.

Moreover, in the system according to this embodiment, the user network devices, content servers and provider gateways can be produced by using basically the same hardware structures. Therefore, mass production enables inexpensive construction of the system. Furthermore, since insertion of the latest advertisement or the like is possible when distributing contents such as video programs, this service can replace the existing television broadcasting service.

Figure 2:
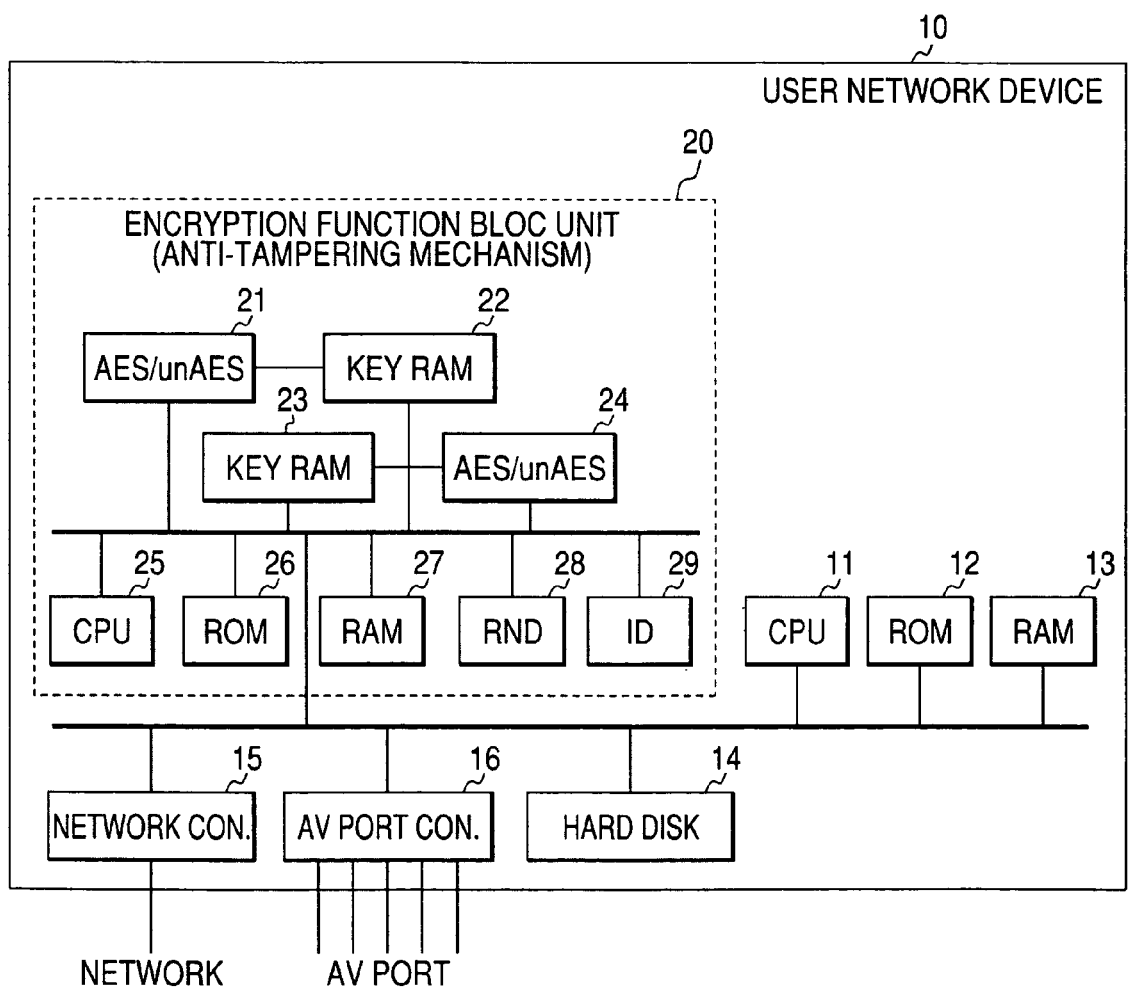
FIG. 2 is a block diagram showing an exemplary structure of a user network device according to an embodiment of this invention.
Figure 3:
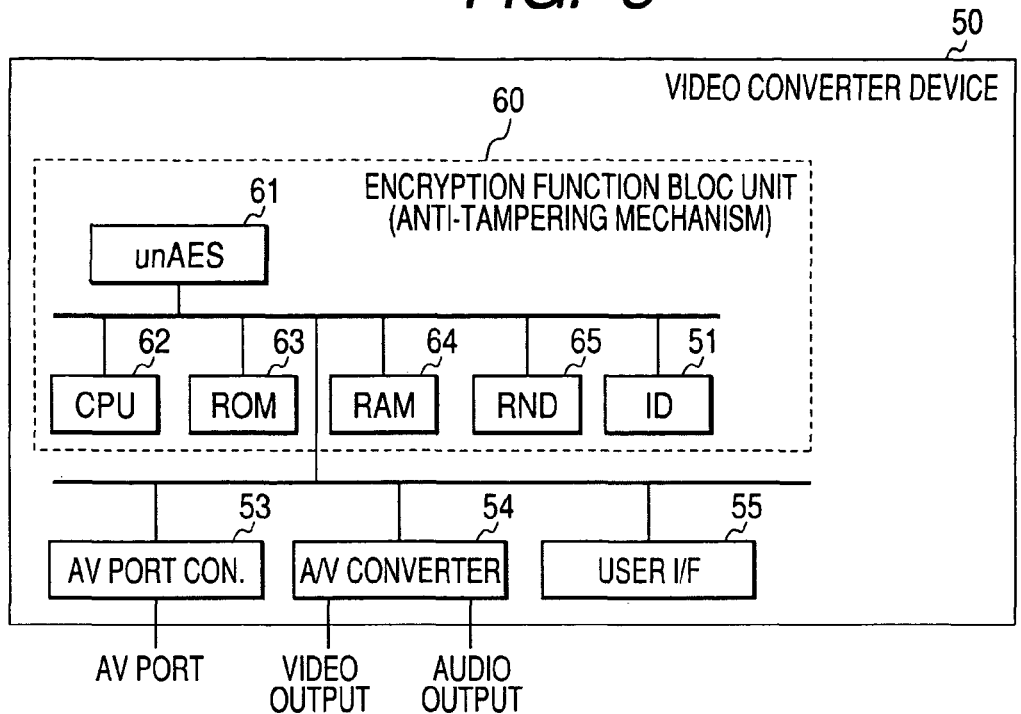
FIG. 3 is a block diagram showing an exemplary structure of an application device according to an embodiment of this invention.
Figure 4:
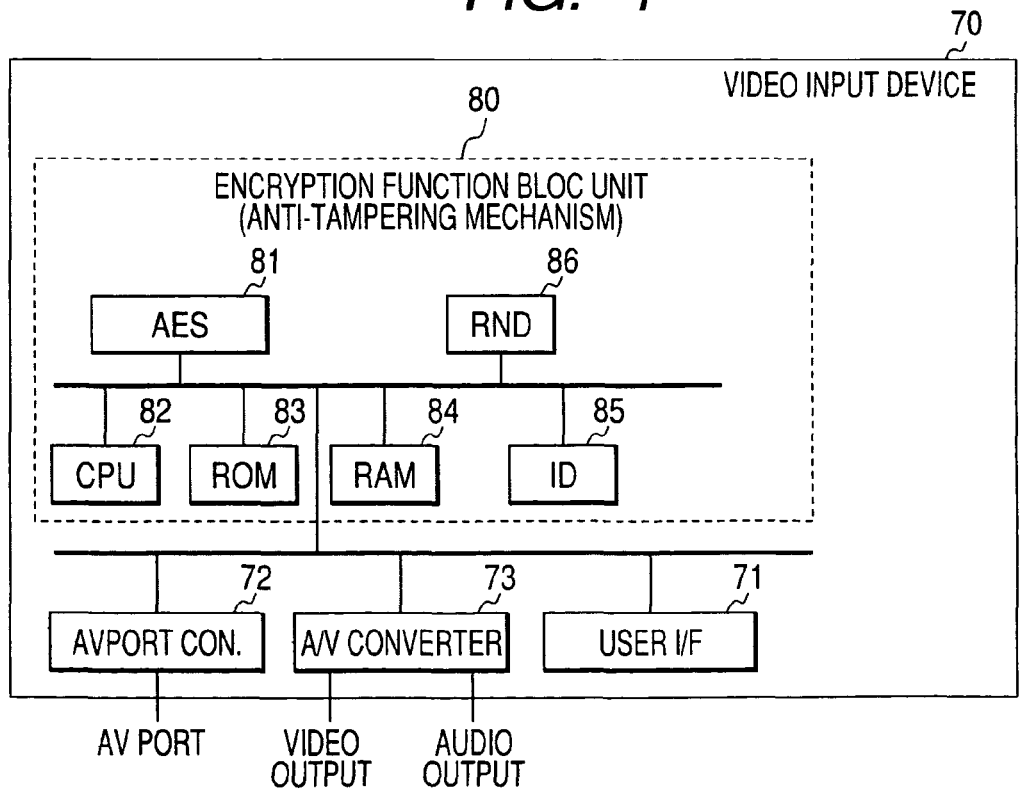
FIG. 4 is a block diagram showing an exemplary structure of a content input device according to an embodiment of this invention.

In the above-described embodiment, the dedicated network devices described with reference to FIGS. 2, 3 and 4 are employed as the devices connected to the network. However, a program (software) for executing functions equivalent to the processing described in this embodiment may be loaded, for example, on a personal computer device that executes various data processing, so that distribution of content data and saving of content data may be carried out by similar processing. The program loaded in the data processing device such as a personal computer device may be stored in various recording (storage) media such as optical discs and memory cards and distributed in this manner, or may be distributed through communication measures such as the Internet.

What is claimed is:

1. A server connected to a predetermined network managing distributed storage of a content in the network, the server comprising:
   a content database having data related to a content managed by the server;
   a content cluster list having data describing a division, into cluster files, of each content managed by the content database, each cluster file comprising a portion of an original file having stored therein the content, wherein the size of each cluster file is determined according to a media category of the content stored in the original file such that at least a cluster file including a first media category of the content has a different size from a cluster file including a second media category of the content different from the first media category of the content;
   a cluster database identifying an address of a device external to the server where each cluster file described in the content cluster list is stored,
   wherein the size of each cluster file is different when the media category of the content stored in the original file is music data than when the media category of the content stored in the original file is video data; and
   an authentication database, wherein the authentication database manages a plurality of keys, each key encrypting each cluster file of a respective storage device described in the cluster database,
   wherein the data related to division into cluster files, stored in the content cluster list, the data related to the address of the device external to the server where each cluster file is stored, stored in the cluster database, and data related to the plurality of keys stored in the authentication database are transmitted, as a cue sheet for reproducing the content, to the address of the device external to the server from which the content data is requested, through the network.

2. A content providing apparatus comprising:
   a communication unit configured to communicate with a predetermined network;
   a content saving unit configured to save at least one cluster file of a plurality of cluster files comprising a content received through the communication unit, each cluster file formed by dividing the content such that each cluster file comprises a portion of an original file having stored therein the content, wherein a size of each cluster file is determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys; and
   a control unit configured to manage a number corresponding to the content saved in the content saving unit and a number corresponding to each saved cluster file, and to transfer a predetermined cluster file saved by the content saving unit to an address of a device external to the content providing apparatus in accordance with a request for transfer of the predetermined cluster file of the content received by the communication unit,
   wherein the control unit is further configured to transfer a cue sheet for reproducing the content to the address of the device external to the content providing apparatus, the cue sheet including data related to the division into cluster files, data related to an address of a device where each cluster file is stored, and data related to the plurality of keys, and
   wherein the size of each cluster file is different when the media category of the content stored in the original file is music data than when the media category of the content stored in the original file is video data.

3. The content providing apparatus as claimed in claim 2, wherein data of the cluster file saved by the content saving unit is data of a cluster file transferred from another content providing apparatus and received by the communication unit.

4. The content providing apparatus as claimed in claim 2, wherein data of the cluster file saved by the content saving unit is data of a cluster file transferred from a predetermined content input unit and received by the communication unit.

5. The content providing apparatus as claimed in claim 2, wherein data of the cluster file saved by the content saving unit is encrypted and saved on the basis of key data received by the communication unit from a predetermined server.

6. A content receiving apparatus comprising:
a communication unit configured to communicate with a predetermined network;
a control unit configured to initiate transfer of cluster data, formed by dividing a predetermined content, from an indicated address of a device external to the content receiving apparatus on the basis of cue data received through the communication unit, the cluster data including a plurality of cluster files each comprised of a portion of an original file having stored therein the content, wherein a size of each cluster file is determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys; and
a content acquisition unit for gathering each cluster data received as a result of the initiation by the control unit and thus acquiring cluster data comprising the content,
wherein the content acquisition unit is further configured to receive a cue sheet for reproducing the content, the cue sheet including data related to the division into cluster files, data related to an address of a device where each cluster file is stored, and data related to the plurality of keys, and
wherein the size of each cluster file is different when the media category of the content stored in the original file is music data than when the media category of the content stored in the original file is video data.

7. The content receiving apparatus as claimed in claim 6, wherein the data of the cluster files acquired by the content acquisition unit is decoded on the basis of individual key data for each cluster data contained in the cue data.

8. The content receiving apparatus as claimed in claim 7, wherein the data of the cluster files decoded by the content acquisition unit is further encrypted by different encryption based on the key data contained in the cue data and thus saved.

9. A server management method comprising:
preparing a content database for managing data related to a content that is distributable through a predetermined network;
preparing a content cluster list having data describing a division of each content managed by the content database into cluster files, each cluster file comprised of a portion of an original file having stored therein the content, wherein a size of each cluster file is determined according to a media category of the content stored in the original file such that at least a cluster file including a first media category of the content has a different size from a cluster file including a second media category of the content different from the first media category of the content; and preparing a cluster database related to an address of a device external to the server where each cluster file described in the content cluster list is stored,
wherein distribution of the content is managed on the basis of the data of the prepared databases and list, and
wherein the size of each cluster file is different when the media category of the content stored in the original file is music data than when the media category of the content stored in the original file is video data;
preparing an authentication database, wherein the authentication database manages a plurality of keys, each key encrypting each cluster file of a respective storage device described in the cluster database; and
preparing a cue sheet for reproducing the content, the cue sheet including data related to the division into cluster files, data related to the address of the device where each cluster file is stored, and data related to the plurality of keys.

10. The server management method as claimed in claim 9, wherein an authentication database for managing a key for encrypting each cluster is further prepared for every storage place of each cluster file described in the cluster database.

11. The server management method as claimed in claim 10, wherein the cue sheet for reproducing the content is prepared from the data related to division into cluster files stored in the content cluster list, the data related to an address of the device external to the server where each cluster file is stored, stored in the cluster database, and data related to the encryption key stored in the authentication database, and
the prepared cue sheet is transmitted to an address of a device external to the server from which content data is requested, through the network.

12. A content providing method comprising:
saving at least one cluster file of a plurality of cluster files comprising a content received through a predetermined network, each cluster file formed by dividing the content such that each cluster file comprises a portion of an original file having stored therein the content, wherein a size of each cluster file is determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys; and
managing a number corresponding to the content saved by the saving and a number corresponding to each saved cluster file, and transferring a predetermined cluster file saved by the saving to an address of an external device in accordance with a request for transfer of a cluster file of the received content by the external device, wherein the transferring further transfers a cue sheet for reproducing the content to the address of the device external to the content providing apparatus, the cue sheet including data related to the division into cluster files, data related to an address of a device where each cluster file is stored, and data related to the plurality of keys, and
wherein the size of each cluster file is different when the media category of the content stored in the original file is music data than when the media category of the content stored in the original file is video data.

13. The content providing method as claimed in claim 12, wherein data of the cluster file saved by the content saving processing is data of a cluster file stored in and transferred from a content storage unit connected through the predetermined network.

14. The content providing method as claimed in claim 12, wherein data of the cluster file saved by the content saving processing is data formed by dividing a content inputted from outside through the predetermined network.

15. The content providing method as claimed in claim 12, wherein data of the cluster file saved by the content saving processing is encrypted and saved on the basis of key data received from a predetermined server.

16. A content receiving method comprising:
initiating a transfer of cluster data, formed by dividing a predetermined content, from an indicated address on the basis of cue data received through a predetermined network, the cluster data including a plurality of cluster files each of which comprises a portion of an original file having stored therein the content, wherein each cluster file is determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys; and
performing content acquisition processing to gather each cluster data received as a result of the initiation in order of numbers thus acquiring cluster data comprising the content,
wherein the content acquisition further receives a cue sheet for reproducing the content, the cue sheet including data related to the division into cluster files, data related to an address of a device where each cluster file is stored, and data related to the plurality of keys, and
wherein the size of each cluster file is different when the media category of the content stored in the original file is music data than when the media category of the content stored in the original file is video data.

17. The content receiving method as claimed in claim 16, wherein decoding processing is performed to decode the data of the cluster files acquired by the content acquisition processing on the basis of individual key data for each cluster data contained in the cue data.

18. The content receiving method as claimed in claim 17, wherein the data of the cluster files decoded by the content acquisition processing is further encrypted by different encryption on the basis of key data contained in the cue sheet and thus saved.

19. A content distribution method comprising:
on a server connected to a predetermined network,
preparing a content database for managing data related to a content that can be distributed through the network,
preparing a content cluster list having data describing a division of each content managed by the content database into cluster files, each cluster file comprised of a portion of an original file having stored therein the content, wherein each cluster file is determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys,
preparing a cluster database identifying an address of a device external to the server where each cluster file described in the content cluster list is stored,
preparing a cue sheet for reproducing the content, the cue sheet including data related to the division into cluster files, data related to the address of the device where each cluster file is stored, and data related to the plurality of keys, and
managing distribution of the content on the basis of the data of the prepared databases and list; and
on a receiving device connected to the predetermined network,
saving at least one cluster file of a plurality of cluster files comprising the received content, each cluster file formed by dividing the content, and
managing a number corresponding to the content saved by the saving and a number corresponding to each saved cluster file, and transferring a predetermined cluster file saved by the saving to an address of a device external to the receiving device indicated by the server in accordance with a request for transfer of a cluster file of the received content from the external device,
wherein the size of each cluster file is different when the media category of the content stored in the original file is music data than when the media category of the content stored in the original file is video data.

20. The content distribution method as claimed in claim 19, wherein content acquisition processing is performed to gather cluster data including a plurality of cluster files transferred from the receiving device to the external device in order of numbers on the basis of cue data sent from the server and thus to acquire data of the content.

21. The content distribution method as claimed in claim 20, wherein decoding processing is performed individually for each cluster file to the data of the cluster file saved by each of the devices, on the basis of individual key data contained in the cue data sent from the server side.

22. A non-transitory computer readable storage medium having stored thereon a program executed by a server connected to a predetermined network, the program carrying out a method comprising:
preparing a content database having data related to a content managed by the server;
preparing a content cluster list having data describing a division of each content managed by the content database into cluster files, each cluster file comprised of a portion of an original file having stored therein the content, wherein each cluster file is determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys;
preparing a cluster database identifying an address of a device external to the server where each cluster file described in the content cluster list is stored; and
preparing a cue sheet for reproducing the content, the cue sheet including data related to the division into cluster files, data related to the address of the device where each cluster file is stored, and data related to the plurality of keys,
wherein the size of each cluster file is different when the media category of the content stored in the original file is music data than when the media category of the content stored in the original file is video data.

23. The computer readable storage medium as claimed in claim 22, further comprising a function of preparing an authentication database, wherein the authentication database manages a key for encrypting each cluster file for every storage place of each cluster file described in the cluster database.

24. The computer readable storage medium as claimed in claim 23, wherein processing is executed to transmit the data related to division into cluster files stored in the content cluster list, the data related to an address of the device external to the server where each cluster file is stored, stored in the cluster database, and data related to the encryption key stored in the authentication database as a cue sheet for reproducing the content to an address of a device external to the server from which the content data is request via the network.

25. A non-transitory computer readable storage medium having stored thereon a program for carrying out a method comprising:
at least one cluster file of a plurality of cluster files comprising a content received through a predetermined network, each cluster file formed by dividing the content and comprised of a portion of an original file having stored therein the content, wherein each cluster file is determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys; and
managing a number corresponding to the content saved by the saving and a number corresponding to each saved cluster file, and transferring a predetermined cluster file saved by the saving and a cue sheet for reproducing the content, the cue sheet including data related to the division into cluster files, data related to an address of a device where each cluster file is stored, and data related to the plurality of keys, to an address of an external device in accordance with a request for transfer of a cluster file of the received content by the external device,
wherein the size of each cluster file is different when the media category of the content stored in the original file is music data than when the media category of the content stored in the original file is video data.

26. The computer readable storage medium as claimed in claim 25, wherein data of the cluster file saved by the content saving processing is encrypted and saved on the basis of key data received from a predetermined server.

27. A non-transitory computer readable storage medium having stored thereon a program for carrying out a method comprising:
initiating a transfer of cluster data formed by dividing a predetermined content from an indicated address on the basis of cue data received through a predetermined network, the cluster data including a plurality of cluster files, each cluster file comprised of a portion of an original file having stored therein the content, wherein each cluster file determined according to a media category of the content stored in the original file such that at least a cluster file including a first media category of the content has a different size from a cluster file including a second media category of the content different from the first media category of the content, each cluster file being encrypted using a key of a plurality of keys stored in an authentication database which manages the plurality of keys; and
gathering each cluster data received as a result of the initiating and thus acquiring cluster data comprising the content,
wherein the gathering further receives a cue sheet for reproducing the content, the cue sheet including data related to the division into cluster files, data related to an address of a device where each cluster file is stored, and data related to the plurality of keys, and
wherein the size of each cluster file is different when the media category of the content stored in the original file is music data than when the media category of the content stored in the original file is video data.

28. The computer readable storage medium as claimed in claim 27, wherein the data of the cluster files acquired by the content acquisition processing is decoded on the basis of individual key data for each cluster data contained in the cue data.

29. The computer readable storage medium as claimed in claim 27, wherein the data of the cluster files decoded by the content acquisition processing is further encrypted by different encryption on the basis of key data contained in the cue data and thus saved.

30. The server as claimed in claim 1, wherein the size of each cluster file is determined according to a size of the content.

31. The server as claimed in claim 30, wherein each cluster file of a particular type is of equal size.

32. The server as claimed in claim 1, wherein the cluster database identifies addresses of a plurality of devices external to the server where each of the cluster files described in the content cluster list are stored, and
wherein at least two of the plurality of devices external to the server each store a copy of the same cluster file.

33. The server as claimed in claim 1, wherein the content stored in the original file is distinct from the original file.

* * * * *